Aug. 1, 1933.  A. H. BURCKHARDT  1,920,676
REVOLVING FISH LURE
Original Filed Aug. 21, 1931
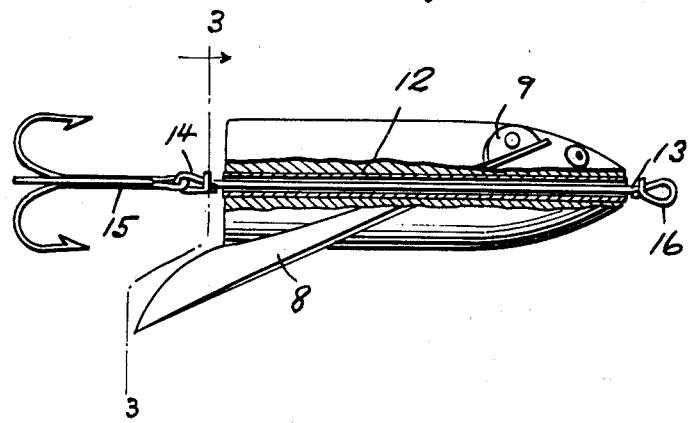
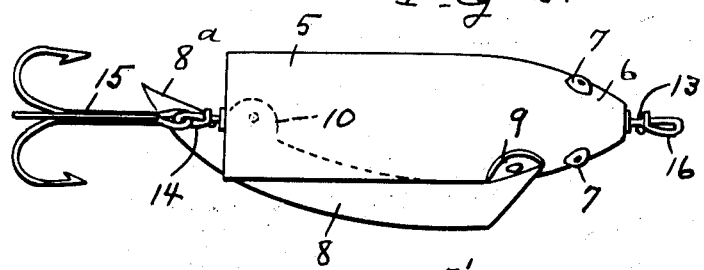
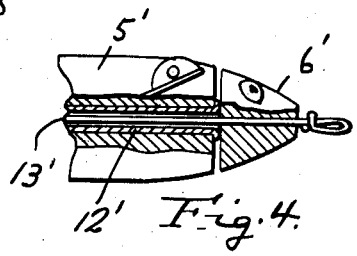
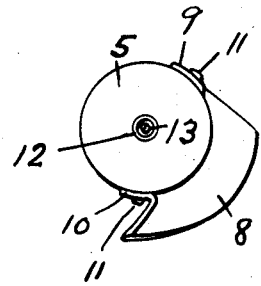
Inventor
August H. Burckhardt
By Clarence A. O'Brien
Attorney Patented Aug. 1, 1933

1,920,676

UNITED STATES PATENT OFFICE 1,920,676

REVOLVING FISH LURE

August H. Burckhardt, Russell, Minn.

Application August 21, 1931, Serial No. 558,619
Renewed June 10, 1933

2 Claims. (Cl. 43—47)

This invention relates to new and useful improvements in artificial bait, and has as its object to provide a bait having a body portion shaped to simulate a minnow, and adapted to revolve as the bait is drawn through the water whereby a life-like motion of the bait is obtained.

A still further object of the invention is to provide in an artificial bait, a body simulating a minnow, and having a spiral fin or blade projecting at one end beyond the corresponding end of the body to be bent either to the right or left relative to the axis of the body whereby lateral motion as well as a rotary motion is obtained as the bait is drawn through the water.

A still further object of this invention is to provide a revolving fish lure which is free of all such projections as might cause weeds or the like to become entangled and cling thereto.

Other objects and advantages of the invention will become apparent from a study of the following description, taken in connection with the accompanying drawing, wherein:

Figure 1 is a sectional elevational view of the lure.

Figure 2 is a top plan view thereof.

Figure 3 is a sectional elevational view taken substantially on the line 3—3 of Figure 1.

Figure 4 is a sectional elevational view of the headed end of the lure, and showing a slightly modified form of the invention.

With reference more in detail to the drawing, it will be seen that the bait comprises a body 5 formed of wood or other suitable material, and being substantially cylindrical in cross section. The body 5 at the headed end 6 thereof is tapered, and is provided with eyes 7—7, whereby to provide means for attracting the fish to the bait. The particular shape of the body is such as simulates a minnow.

Spiralled about the body and detachably connected therewith is an elongated fin or blade 8 that, at one edge, is provided with angularly disposed attaching flanges or lugs 9 and 10 secured by rivets or other suitable means 11 at diametrically opposite sides of the body as shown in Figure 3, with the flange or lug 9 at the forward end of the blade being secured to the body adjacent the head 6 thereof, and the flange or lug 10 being secured to the body adjacent the rear end thereof.

The rear end 8a of the fin or blade projects beyond the corresponding end of the body 5 and may be bent laterally towards the right or left relative to the longitudinal axis of the body so that besides a rotary motion imparted to the body by reason of blade 8 when the body is drawn through the water, sidewise or lateral motion in a direction dependent upon the direction of bend of the end 8a is also obtained. Thus the movement of the body through the water will, in every respect simulate the movement of a live minnow.

The body has extending longitudinally therethrough a bore within which is disposed a lining tube 12. A rod or stem 13 extends through the sleeve and is provided, at its rear end, with an eye 14 with which is engaged a conventional fish hook 15, and at its front or forward end with an eye 16 for engagement with one end of a fish line (not shown).

In Figure 4 I have shown a slightly modified form of the invention and, as therein shown, the body 5' is divided transversely adjacent one end so that the headed end 6' thereof is separate and apart from the main body. Thus the main body, by reason of the fin 8', will rotate about its longitudinal axis while the head 6' will remain fixed. In this form of the invention, the sleeve or tube 12' extends only through the body 5' while the axial opening in the head 6' is of such diameter as to permit of frictional engagement of the head 6' with the rod 12' so that the head 6' will be retained relatively fixed in respect to the rod and to the revolving body 5'.

The fin or blade 8 may be colored if desired as might also the body 5 and headed end thereof to enhance the life-like appearance and add to the luring qualities of the bait.

Even though I have herein shown and described the preferred embodiments of the invention, it is to be understood that the same is susceptible to changes fully comprehended by the spirit of the invention as herein described and the scope of the appended claims.

What is claimed is:

1. A fish lure comprising a stem, a body rotatably arranged on the stem, a spiral fin having ears on its inner edge, one ear being spaced from the rear end of the fin, said ears being attached to the front and rear of the body and at substantially opposite sides thereof with the rear end of the fin projecting beyond the body to be formed of bendable material whereby said end can be bent in either direction, means for attaching a line to the front end of the stem, and means for attaching a hook to the rear end of the stem.

2. A fish lure comprising a stem, a sectional body including a body part and a head part, the head part being frictionally held on the front end of the stem and the body part having a tube passing longitudinally therethrough and through which the stem passes, whereby said body part will rotate on the stem, a spiral fin having a pair of ears on its inner edge, one arranged at the front end of the fin and the other a distance from the rear end thereof, said edge being attached to the body part substantially on opposite sides of said body part, means for attaching a line to the front end of the shaft, and means for attaching a hook to the rear end thereof, the rear end of the fin extending beyond the rear end of the body part and being formed of bendable material.

AUGUST H. BURCKHARDT.